(12) United States Patent
Hubner et al.

(10) Patent No.: US 12,356,880 B2
(45) Date of Patent: Jul. 15, 2025

(54) POWERED CLEARING-DISKS, CONTROL SYSTEM, AND METHOD OF USE

(71) Applicant: DEERE & COMPANY, Moline, IL (US)

(72) Inventors: Cary S. Hubner, Geneseo, IL (US); Grant J. Wonderlich, Milan, IL (US); Mark E. Barker, Johnston, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/510,813

(22) Filed: Nov. 16, 2023

(65) Prior Publication Data

US 2024/0147890 A1   May 9, 2024

Related U.S. Application Data

(63) Continuation of application No. 17/062,802, filed on Oct. 5, 2020, now Pat. No. 11,825,762.

(60) Provisional application No. 62/928,600, filed on Oct. 31, 2019.

(51) Int. Cl.
*A01B 69/02* (2006.01)
*A01B 79/00* (2006.01)

(52) U.S. Cl.
CPC .......... *A01B 69/024* (2013.01); *A01B 79/005* (2013.01)

(58) Field of Classification Search
CPC .............................. A01B 79/005; A01B 69/024
See application file for complete search history.

(56) References Cited

U.S. PATENT DOCUMENTS

| | | | |
|---|---|---|---|
| 2,906,080 A * | 9/1959 | Light, Sr. | E01H 1/053 172/14 |
| 2,969,601 A | 1/1961 | McMaster | |
| 4,483,401 A | 11/1984 | Robertson | |
| 4,989,676 A * | 2/1991 | Rogers | A01D 42/06 172/438 |
| 5,050,372 A | 9/1991 | Heiskell | |
| 5,076,180 A | 12/1991 | Schneider | |

(Continued)

FOREIGN PATENT DOCUMENTS

| CA | 2023798 C | 3/1994 |
|---|---|---|
| CA | 2695738 A1 | 6/2010 |
| CA | 2885452 A1 | 9/2016 |

(Continued)

OTHER PUBLICATIONS

Extended European Search Report and Written Opinion issued in EP Application No. 20204524.1, dated Apr. 1, 2021; 8 pages.

*Primary Examiner* — Tara Mayo
(74) *Attorney, Agent, or Firm* — Taft Stettinius & Hollister LLP; Stephen F. Rost

(57) ABSTRACT

An agricultural row unit adapted to be moved over soil by an agricultural planter to clear crop residue includes a residue clearing disk or brush. The row unit may include a motor to drive rotation of a crop residue disk or brush. The agriculture row unit may also include a controller configured to adjust the operating speed of the motor in response to factors internal and/or external to the agricultural row unit. The factors may include at least one of a speed of the agricultural planter along the row, a height of crop residue disk or brush the relative to a surface of the soil, a height of the crop residue disk or brush relative to a surface of the soil, amount of crop residue in the row, and a downforce pressure on the row unit.

19 Claims, 9 Drawing Sheets

(56) References Cited

U.S. PATENT DOCUMENTS 5,507,351 A 4/1996 Martin
2021/0045276 A1 2/2021 Henry

FOREIGN PATENT DOCUMENTS

| CA | 2889850 A1 | 10/2016 |
| CN | 205912447 U | 2/2017 |
| CN | 208191248 U | 12/2018 |
| EP | 2404492 A2 | 1/2012 |
| FR | 2646321 A1 | 11/1990 |
| WO | 2009127066 A1 | 10/2009 |

* cited by examiner

POWERED CLEARING-DISKS, CONTROL SYSTEM, AND METHOD OF USE

RELATED APPLICATIONS

This application is a continuation of U.S. patent application Ser. No. 17/062,802, filed Oct. 5, 2020, which claims priority to U.S. Provisional Application Ser. No. 62/928,600, filed Oct. 31, 2019, the disclosures of which are hereby incorporated by reference in their entirety.

FIELD OF THE DISCLOSURE

The present disclosure relates to an agricultural row unit, and in particular, to a row unit for clearing crop residue or other material from an agricultural row of a field.

BACKGROUND OF THE DISCLOSURE

An agricultural implement such as a row crop planter may include a row unit adapted to apply seed or fertilizer to a field. Some agricultural machines are capable of clearing crop residue, soil, or other debris from a row of a field. With some of these machines, clearing-disks are located forward of the seed distribution area so that the residue may be cleared from a row prior to the seed being planted. The clearing-disks may extend into the soil and may be rotated by the soil as the machine moves over the soil. It may be desirable to change the rotational speed or position of one or more of the clearing-disks, which may present challenges, especially when the clearing-disks are driven by soil as the machine moves over the soil.

SUMMARY

In one embodiment of the present disclosure an agricultural row unit that is adapted to be moved in a forward direction over soil to clear agricultural residue includes: an attachment frame; a drive clearing-disk coupled to the attachment frame for rotation about a first axis; and a driven clearing-disk coupled to the attachment frame for rotation about a second axis offset from the first axis; wherein the drive clearing-disk is drivingly coupled to the driven clearing-disk to rotate the driven clearing-disk about the second axis.

In some embodiments, the agricultural row unit includes a motor coupled to the drive clearing-disk and configured to rotate the drive clearing-disk about the first axis. The agricultural row unit includes a controller configured to adjust a speed of rotation of the motor in response to at least one of a speed of forward movement of the agricultural row unit over the soil, a height of the drive clearing-disk relative to a surface of the soil, a height of the driven clearing-disk relative to a surface of the soil, an amount of crop residue in an agricultural row, and a downforce pressure on a portion of the agricultural row unit.

In some embodiments, the drive clearing-disk extends radially outward away from the first axis to define an outer boundary of the drive clearing-disk. The outer boundary of the drive clearing-disk includes a lowermost point relative to a surface of the soil. The driven clearing-disk extends radially outward away from the second axis to define an outer boundary of the driven clearing-disk. The outer boundary of the driven clearing-disk includes a lowermost point relative to the surface of the soil. The lowermost point of the driven clearing-disk is positioned above the lowermost point of the drive clearing-disk during operation of the agricultural row unit. In some embodiments, the lowermost point of the drive clearing-disk is positioned below the surface of the soil during operation of the agricultural row unit. In some embodiments, the lowermost point of the driven clearing-disk is positioned above the surface of the soil during operation of the agricultural row unit.

In some embodiments, the outer boundary of the drive clearing-disk includes a forward-most point relative to the forward direction of movement of the agricultural planter. The outer boundary of the driven clearing-disk includes a forward-most point relative to the forward direction of movement of the agricultural planter. The forward-most point of the drive clearing-disk is positioned rearwardly of the forward-most point of the driven clearing-disk during operation of the agricultural planter. In some embodiments, the first axis and the second axis are not contained in the same plane.

In some embodiments, the agricultural row unit includes a gear assembly drivingly coupled between the drive clearing-disk and the driven clearing-disk. When the drive clearing-disk rotates at a first speed the gear assembly is configured to rotate the driven clearing-disk at a second speed greater than the first speed. The gear assembly includes a slip clutch reconfigurable between (i) a first mode in which the slip clutch is engaged with the drive clearing-disk and the driven clearing-disk and facilitates rotation of the driven clearing-disk, and (ii) a second mode in which a portion of the slip clutch is disengaged from the driven clearing-disk to allow the drive clearing-disk to rotate independently of the driven clearing-disk.

In some embodiments, the driven disk is movable relative to the attachment frame between (i) a first position in which a first disk-to-disk angle is defined by the intersection of first axis and the second axis and (ii) a second position in which a second disk-to-disk angle is defined by the intersection of first axis and the second axis. The second disk-to-disk angle is different than the first disk-to-disk angle. The driven disk is movable relative to the attachment frame between (i) a third position in which a first disk-to-soil angle is defined between the second axis and a plane approximating the surface of the soil (ii) a fourth position in which a second disk-to-soil angle is defined between the second axis and the plane approximating the surface of the soil. The second disk-to-soil angle is different than the first disk-to-soil angle. In some embodiments, a controller is coupled to the driven clearing-disk, and the controller is configured to move the driven disk between the first and second positions and between the third and fourth positions.

In another embodiment, an agricultural row unit is adapted to be moved horizontally over soil to clear agricultural residue, and the agricultural row unit includes: an attachment plate; a linkage assembly having a first end pivotably coupled to the attachment plate and a second end opposite the first end; an attachment frame pivotably coupled to the second end of the linkage assembly; a clearing brush coupled to the attachment frame for rotation about a longitudinal axis of the clearing brush; and a motor drivingly coupled to the clearing brush and configured to rotate the clearing brush about the longitudinal axis; wherein the longitudinal axis of the clearing brush defines a vector having a horizontal component and a vertical component that is greater than the horizontal component.

In some embodiments, the agricultural row unit includes a lateral shield (i) pivotably coupled to the attachment frame for movement relative to the attachment frame in the vertical direction and (ii) adjustable between a plurality of lateral positions in each of which the lateral shield is spaced apart a different lateral distance from the attachment frame. The agricultural row unit includes a knock-off shield coupled to the attachment frame, spaced apart from the lateral shield, and arranged a predefined distance away from the clearing brush such that the knock-off shield interacts with and removes residue from the clearing brush when the clearing brush is rotated about the longitudinal axis.

In another embodiment, a method of clearing agricultural residue from an agricultural row includes: moving an agricultural row unit over soil in a forward direction; operating a motor coupled to a drive clearing-disk at an operating speed to rotate the drive clearing-disk about a first axis and to rotate a driven clearing-disk about a second axis offset from the first axis; adjusting the operating speed of the motor in response to at least one of: a speed of the agricultural row unit in the forward direction, a height of the drive clearing-disk relative to a surface of the soil, a height of the driven clearing-disk relative to the surface of the soil, an amount of crop residue in the row, and a downforce pressure on a portion of the agricultural row unit.

In some embodiments, operating a motor coupled to a drive clearing-disk at an operating speed to rotate the drive clearing-disk about a first axis and to rotate a driven clearing-disk about a second axis offset from the first axis includes: engaging the drive clearing-disk with a gear assembly driven by the drive clearing-disk; and engaging the gear assembly with the driven clearing-disk to drive rotation of the driven clearing-disk about the second axis.

In some embodiments, the method includes rotating the drive clearing-disk at a first speed; and rotating the driven clearing-disk at a second speed greater than the first speed. The method includes adjusting a position of the second axis relative to a position of the first axis.

In some embodiments, operating a motor coupled to a drive clearing-disk at an operating speed to rotate the drive clearing-disk about a first axis and to rotate a driven clearing-disk about a second axis offset from the first axis includes: positioning a lowermost point of an outer boundary of the drive clearing-disk at a first height relative to the surface of the soil; and positioning a lowermost point of an outer boundary of the driven clearing-disk at a second height positioned above the first height relative to the surface of the soil.

In some embodiments, positioning a lowermost point of an outer boundary of the driven clearing-disk at a second height positioned above the first height relative to the surface of the soil includes: positioning the lowermost point of the outer boundary of the driven disk above or substantially aligned with the surface of the soil.

In some embodiments, operating a motor coupled to a drive clearing-disk at an operating speed to rotate the drive clearing-disk about a first axis and to rotate a driven clearing-disk about a second axis offset from the first axis includes: positioning a forwardmost point of the outer boundary of the drive clearing-disk at a first position; and positioning a forwardmost point of the outer boundary of the driven clearing-disk at a second position located forward of the first position. In some embodiments, the method includes adjusting an angle defined by the intersection of second axis and the surface of the soil in response to at least one of: a speed of the agricultural row unit along the row, amount of agricultural residue in the row, and a downforce pressure on a portion of the agricultural row unit.

In another embodiment, an agricultural row unit adapted to be moved in a forward direction over soil to clear agricultural residue includes: an attachment frame; a drive clearing-disk coupled to the attachment frame for rotation about a first axis; a driven clearing-disk coupled to the attachment frame for rotation about a second axis offset from the first axis; and a motor coupled to at least one of the drive clearing-disk and the driven-clearing disk configured to rotate the at least one of the drive clearing-disk and the driven-clearing disk about the first axis or the second axis.

In another embodiment, an agricultural row unit adapted to be moved in a forward direction over soil to clear agricultural residue includes: an attachment frame; a plurality of clearing-disks including at least: a drive clearing-disk coupled to the attachment frame for rotation about a first axis, a driven clearing-disk coupled to the attachment frame for rotation about a second axis offset from the first axis; and a plurality of motors including at least: a first motor coupled to the drive clearing-disk and configured to rotate drive-clearing disk about the first axis, and a second motor coupled to the driven clearing-disk and configured to rotate the driven-clearing disk about the second axis.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
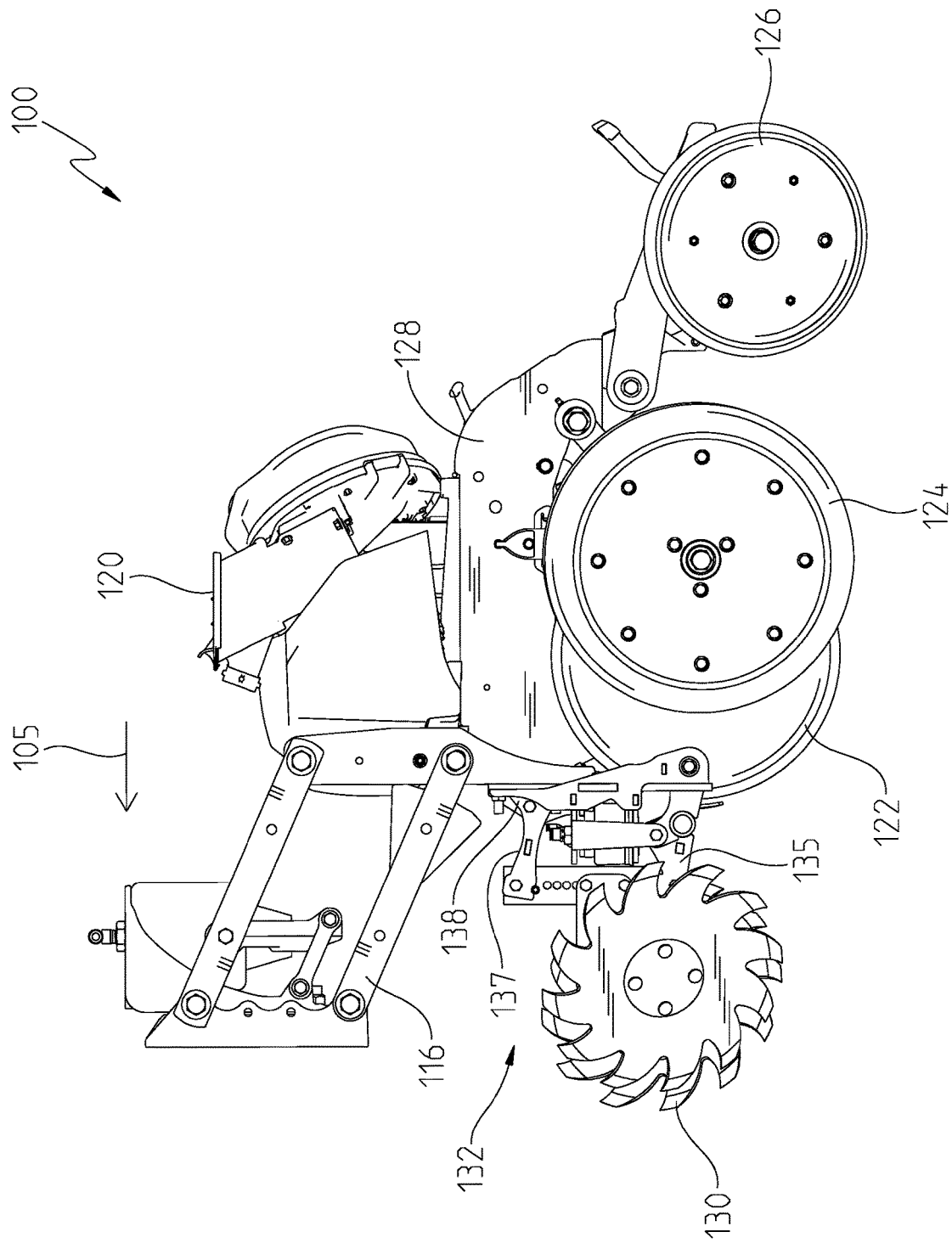
FIG. 1 is a side view of a planter row unit adapted for use with an agricultural machine showing that the row unit includes a clearing assembly.

Referring to FIG. 1 of the present disclosure, a planter row unit or agricultural row unit 100 is shown. The row unit 100 is adapted for use with an agricultural implement. The row unit 100 may be coupled to a main frame of the agricultural implement via a parallel linkage 116 or another suitable linkage. The parallel linkage 116 allows for independent vertical movement of the planting row unit 100 as it traverses along uneven ground.

Each planter row unit 100 may include a row unit shank 128 to which a seed hopper 120 is coupled. The seed hopper 120 may store seed to be planted by the planter row unit 100 during a planting operation. Seed may be deposited within a trench or furrow formed by opening disks 122. The depth at which the opening disk or disks 122 is set relative to the soil may be set by a gauge wheel or wheels 124 and a depth-setting mechanism. A closing wheels 126 may be further coupled to the shank 128 of the row unit 100 in order to close or cover the trench with soil.

The row unit 100 may also include a fertilizer applicator including a hopper or container 108 for storing fertilizer, e.g., dry granular fertilizer, or a tank for storing gaseous or liquid fertilizer. The fertilizer applicator may further include a cutting disk positionable at a defined depth into the soil to form a furrow or trench therein. The fertilizer applicator may further include a gauge used to set the depth of the furrow or trench to be formed by the cutting disk. It should be appreciated that the cutting disk and the opening disks 122 described above are discrete from clearing disks, which will be described below in greater detail as clearing disks 130.

As suggested above, the agricultural row unit 100 further includes one or more clearing disks 130. The clearing disks 130 are configured to clear crop residue, soil, or other material from a row of the field to be planted and fertilized.

Figure 2:
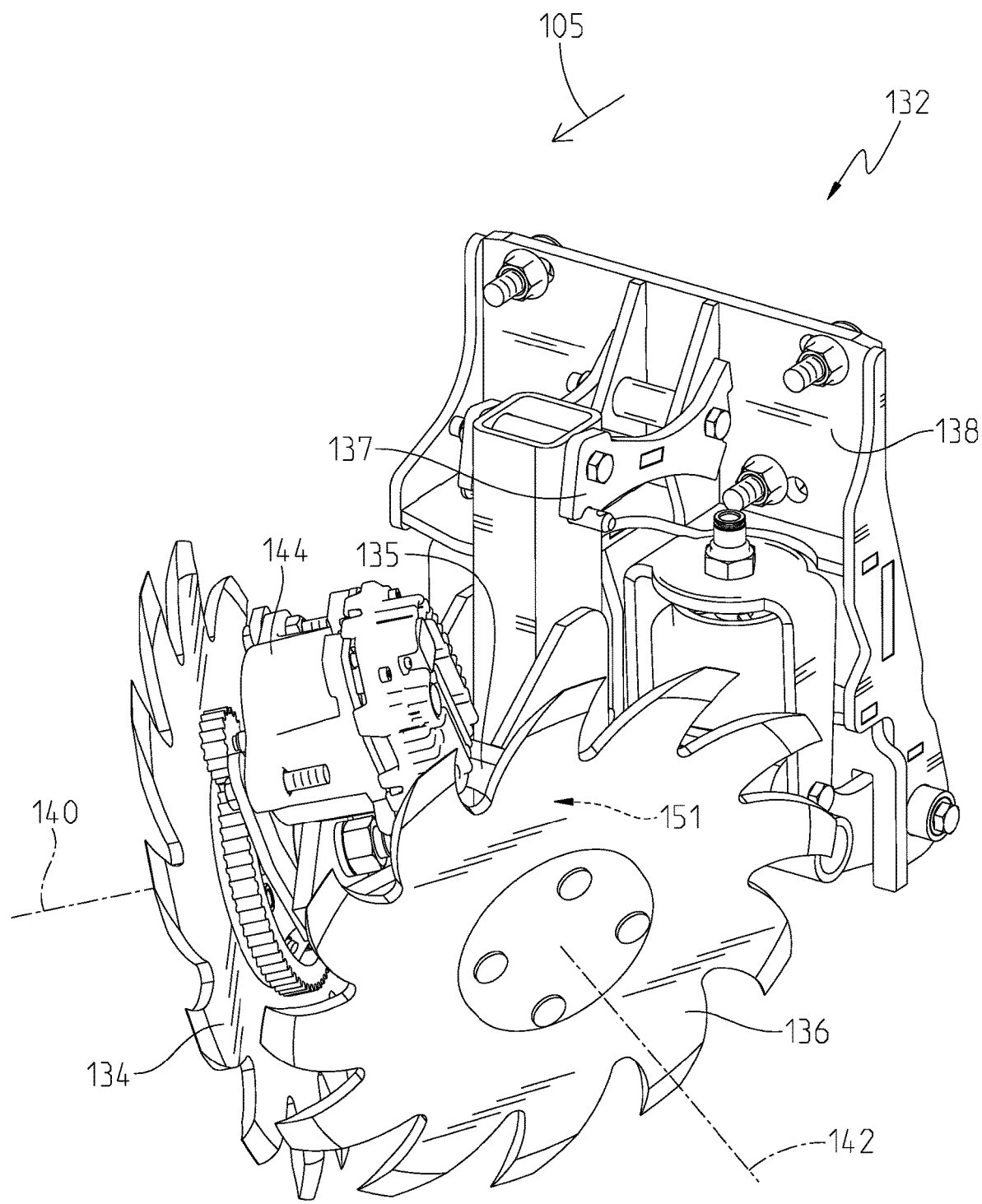
FIG. 2 is a front perspective view of the clearing assembly of FIG. 1.
Figure 3:
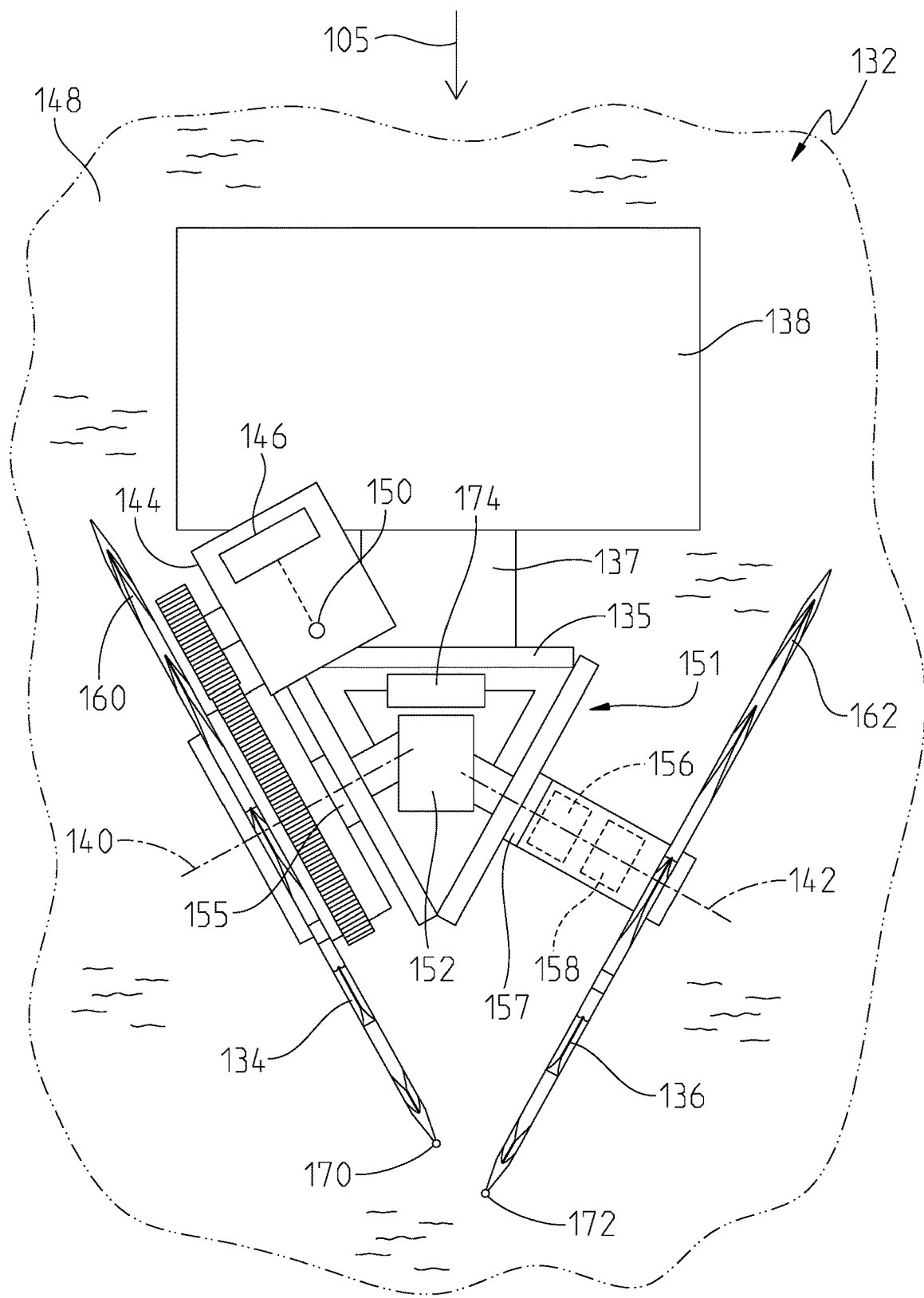
FIG. 3 top diagrammatic view of the clearing assembly of FIG. 2.

As shown in FIGS. 2 and 3, the clearing disks 130 may be included in a clearing assembly 132. The clearing assembly 132 includes an attachment plate 138, an attachment frame 135, a linkage assembly 137 coupled therebetween, a drive clearing-disk 134, and a driven clearing-disk 136. The attachment plate 138 is coupled to the row unit shank 128 (or otherwise arranged on the row unit 100) in a forward-facing orientation, such that the clearing disks 130 are arranged to be pushed by the attachment plate 138 in the forward direction 105 during forward movement of the row unit 100. The drive clearing-disk 134 is configured to drive rotation of the driven clearing-disk 136. In the illustrative embodiment, the drive clearing-disk 134 is coupled to the attachment frame 135 and configured to rotate about a first axis 140. The driven clearing-disk 136 is coupled to the attachment frame 135 and configured to rotate about a second axis 142. The second axis 142 is offset from the first axis 140 (i.e., the second axis 142 is different than the first axis 140).

In some embodiments, the clearing assembly 132 also includes a final drive assembly configured to drive rotation of the drive clearing-disk 134. The final drive assembly can be driven by a drive unit 144 or other power mechanism. In the illustrative embodiment, the drive unit 144 is an electric motor included in the clearing assembly 132. It should be appreciated that the row unit 100 may include a plurality of clearing assemblies 132, and each clearing assembly 132 may include a separate drive unit 144. Further, the row unit 100 may move along several agricultural rows of field simultaneously. As such, each individual agricultural row may be cleared by a corresponding clearing assembly 132 having a corresponding drive unit 144.

In some embodiments, each clearing assembly 132 may include a controller 146 electrically coupled to the drive unit 144. The controller 146 is configured to adjust the drive speed of the drive unit 144 in response to one or more factors including: a speed of forward movement of the agricultural row unit 100 over the soil, a height of the drive clearing-disk 134 relative to a surface of the soil 148, a height of the driven clearing-disk 136 relative to a surface of the soil, an amount of crop residue in an agricultural row of the field, and a downforce on a portion the row unit 100. In some embodiments, each clearing assembly 132 may further include a sensor 150 electrically coupled to the controller 146. The sensor 150 is configured to identify the amount of crop residue or other material in an agricultural row of the field and transmit a signal to the controller 146 indicative of the amount of crop residue or other material. The controller 246 may also be configured to adjust the drive speed in response to a predetermined prescribed operating plan for the field. In other, embodiments, a user may adjust the drive speed of the drive unit 144 via a user input separate from the controller 146.

It should be appreciated that while a surface of soil is generally uneven, the term "surface of the soil" as used herein means an imaginary plane approximating a surface of soil, upon which the row unit 100 is traveling as the row unit 100 move moves horizontally along an agricultural row in the field.

Referring still to FIGS. 2 and 3, the clearing assembly 132 further includes a gear assembly 151 that is coupled between the drive clearing-disk 134 and the driven clearing-disk 136. The gear assembly 151 is configured to transmit rotational motion from the drive clearing-disk 134 to the driven clearing-disk 136. As such, the gear assembly 151 is drivingly coupled between the drive clearing-disk 134 and the driven clearing-disk 136.

In some embodiments, the gear assembly 151 includes a number of disk-connecting gears 152 (such as bevel gears and spur gears) for transmitting rotational motion from the drive clearing-disk 134 to the driven clearing-disk 136. In some embodiments, the gear assembly 151 includes gear-step unit 156 configured rotate the driven clearing-disk 136 at different speed than that of the drive clearing-disk 134. In the illustrative embodiment, the drive clearing-disk 134 is rotated by the drive unit 144 (or by other means) at a first speed, and the gear-step unit 156 is configured to rotate the driven clearing-disk 136 at a second speed greater than the first speed.

In some embodiments, the gear assembly 151 includes a slip clutch 158 including a first portion fixed to the drive clearing disk 134 and a second portion fixed to the driven clearing-disk 136. The slip clutch 158 is reconfigurable between a first mode and a second mode. In the first mode, the slip clutch 158 is engaged with the drive clearing-disk 134 and the driven clearing-disk 136, and the slip clutch 158 facilitates rotation of the driven clearing-disk 136 by the drive clearing-disk 134. In the second mode, a first portion of the slip clutch 158 disengaged from the second portion of the slip clutch 158 to allow the drive clearing-disk 134 to rotate independently of the driven clearing-disk 136. With this arrangement, if the driven clearing-disk 136 encounters immovable debris along the agricultural row, the driven clearing-disk 136 may cease rotation and the drive clearing-disk 134 may continue to rotate without damaging the gear assembly 151 or other components of the clearing assembly 132.

Figure 4B:
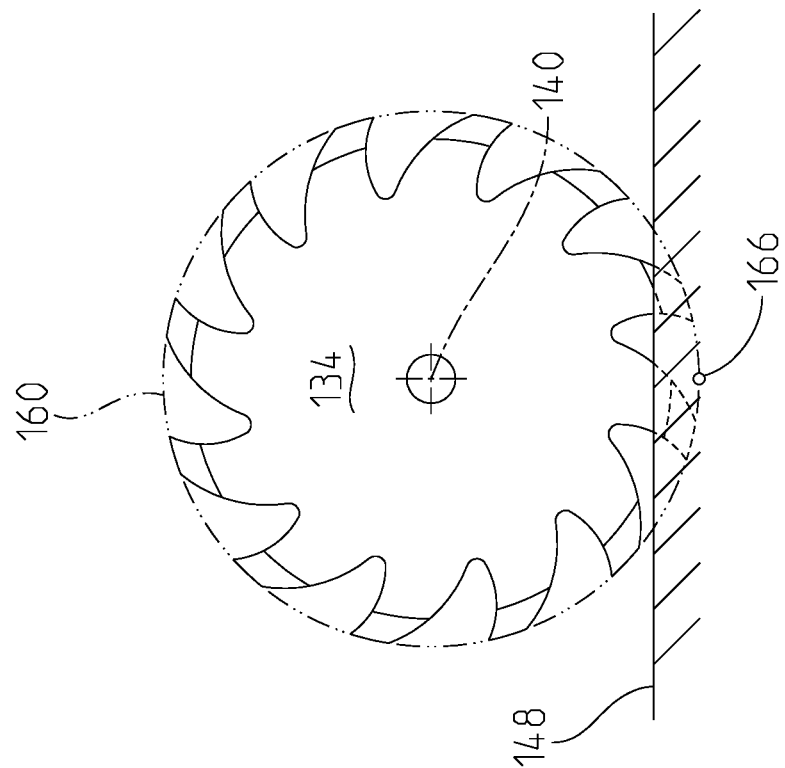
FIGS. 4A and 4B are side views of a clearing-disk included in the clearing assembly of FIG. 2 showing the clearing-disk positioned at various heights the relative to a surface of the soil.
Figure 4A:
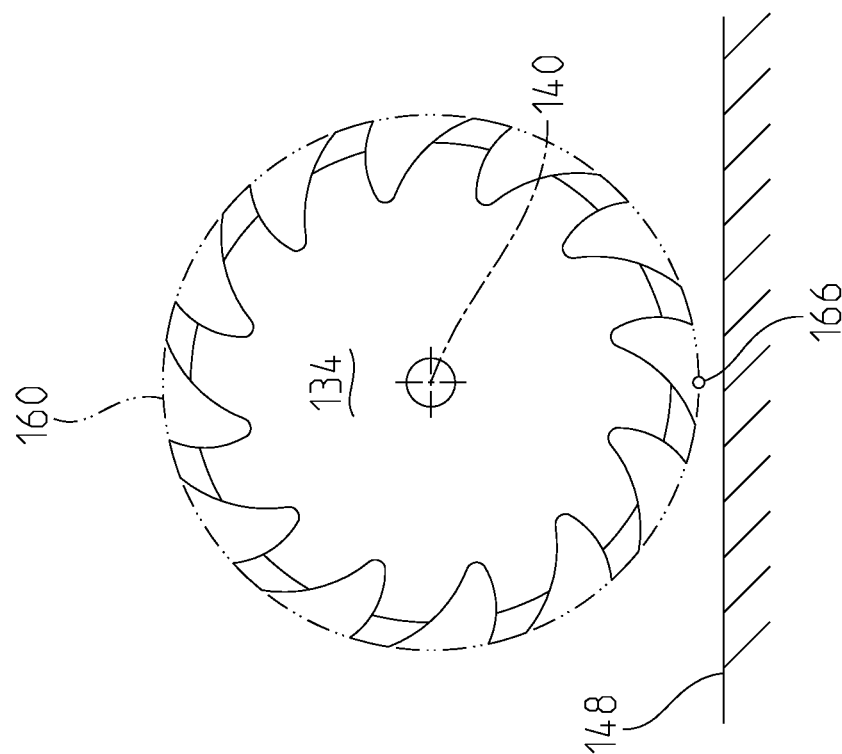

As shown in FIGS. 4A-4B, the drive clearing-disk extends 134 radially outward away from the first axis 140 to define an outer boundary 160 of the drive clearing-disk 134. The driven clearing-disk 136 extends radially outward away from the second axis 142 to define an outer boundary 162 of the driven clearing-disk 136. During rotation of the drive clearing-disk 134, the outer boundary 160 of the drive clearing-disk 134 includes a lowermost point 166 relative to the surface of the soil 148. Similarly, during rotation of the driven clearing-disk 136, the outer boundary 162 of the driven clearing-disk 136 includes a lowermost point (not shown) relative to the surface of the soil 148.

In some embodiments, the lowermost point 166 of the drive clearing-disk 134 is positioned above the surface of the soil 148 during operation of the row unit 100. In some embodiments, the drive clearing-disk 134 is positioned below the surface of the soil 148, and as the row unit 100 moves through the field, the drive clearing-disk 134 contacts the soil or a sub-surface of the soil causing rotation of the drive clearing-disk 134. In such an embodiments, the drive clearing-disk 134 is driven by the soil while the driven clearing-disk 136 is driven by the drive clearing-disk 134. As such, the lowermost point of the driven clearing-disk 136 and the lowermost point 166 of the drive clearing-disk 134 are positioned at different heights. For example, the lowermost point of the driven clearing-disk 136 may be positioned above the lowermost point 166 of the drive clearing-disk 134.

Referring again to FIG. 3, during rotation of the drive clearing-disk 134, the outer boundary 160 of the drive clearing-disk 134 includes a forward-most point 170. As used here, "forward" is used relative to the forward direction of movement of the agricultural planter, as shown by the arrow 105. Further, the outer boundary 162 of the driven clearing-disk 136 includes a forward-most point 172. The forward-most point 170 of the drive clearing-disk 134 is positioned rearwardly of the forward-most point 172 of the driven clearing-disk 136.

In some embodiments, the lowermost point of the driven clearing-disk 136 is movable relative to the lowermost point 166 of the drive clearing-disk 136. Similarly, in some embodiments, forward-most point 170 of the drive clearing-disk 134 movable relative to the forward-most point 172 of the driven clearing-disk 136.

To facilitate movement of the disks 134, 136, the clearing assembly 132 may include a first linear actuator 155 coupled to and configured to move the drive clearing-disk 134 and a second linear actuator 157 coupled to and configured to move the driven clearing-disk 136, as shown in FIG. 3. The first and second linear actuators 155, 157 may be configured to facilitate sliding, rotational, or complex motion of the disks 134, 136. Such motion may be facilitated relative to the ground 148, the attachment frame 135, or in association with one disk relative to the other disk. In some embodiments, each linear actuator 155, 157 may include a cam (such as an elliptical cam) connected to an electronic motor (such as a stepper motor) configured to move the disk 134, 136. In some embodiments, each linear actuator 155, 157 may include lead screw or worm gear configured to move the disks 134, 136.

In an illustrative embodiment, the clearing assembly 132 may include a controller 174 electrically coupled to one or both of the drive clearing-disk 134 and the driven clearing-disk 136. The controller 174 may be discrete from the controller 146, in communication with the controller 146, or included in the controller 146. Each controller 146, 174 may be controlled by a master controller or may operate independently. In some embodiments, the controller 174 is configured to adjust the forward-most point 172 of the driven clearing-disk 136 relative to the forward-most point 170 of the drive clearing-disk 134.

In some embodiments, the controller 174 is configured to adjust the lowermost point of the driven clearing-disk 136 relative to the lowermost point 166 of the drive clearing-disk 136. In some embodiments, the controller 174 is configured to adjust the height of one or both of the disks 134, 136 in response any number of the following factors including: a speed of forward movement of the agricultural row unit 100 over the soil, a height of the drive clearing-disk 134 relative to the surface of the soil 148, a height of the driven clearing-disk 136 relative to a surface of the soil, an amount of crop residue in an agricultural row of the field, and a downforce on a portion the row unit 100.

Figure 5A:
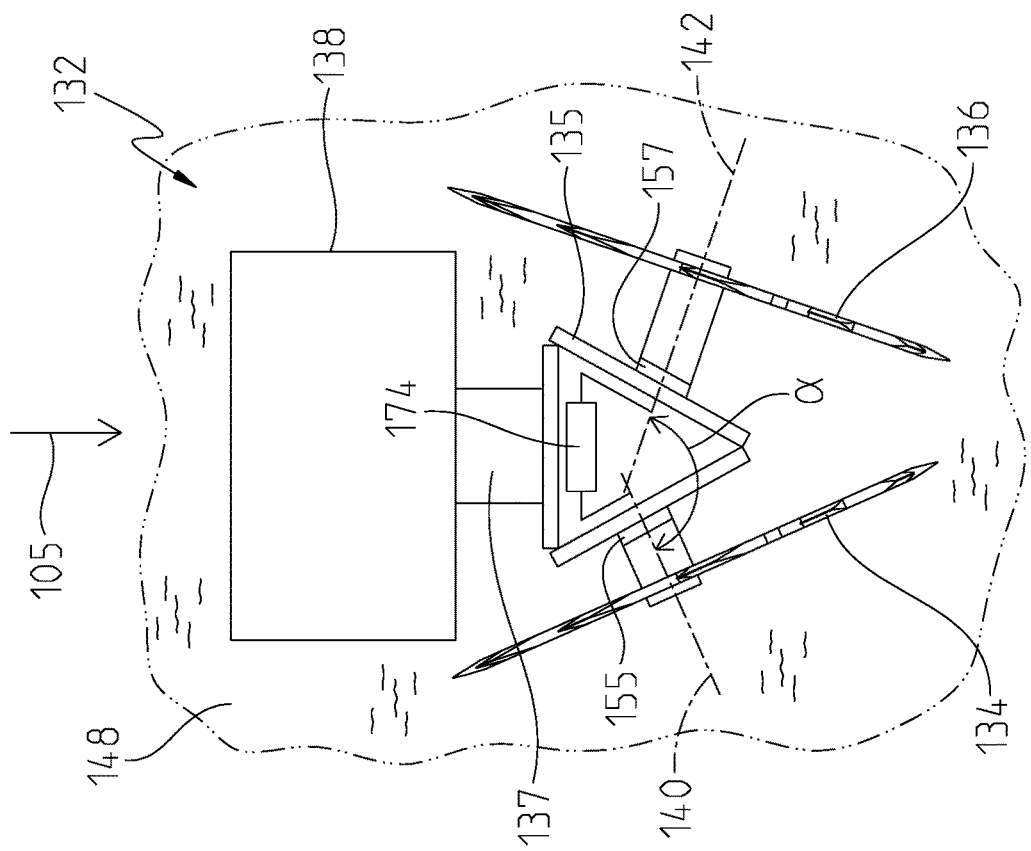
FIGS. 5A and 5B are top diagrammatic views similar to FIG. 3 showing clearing disks positioned at different disk-to-disk angles relative to each other.
Figure 5B:
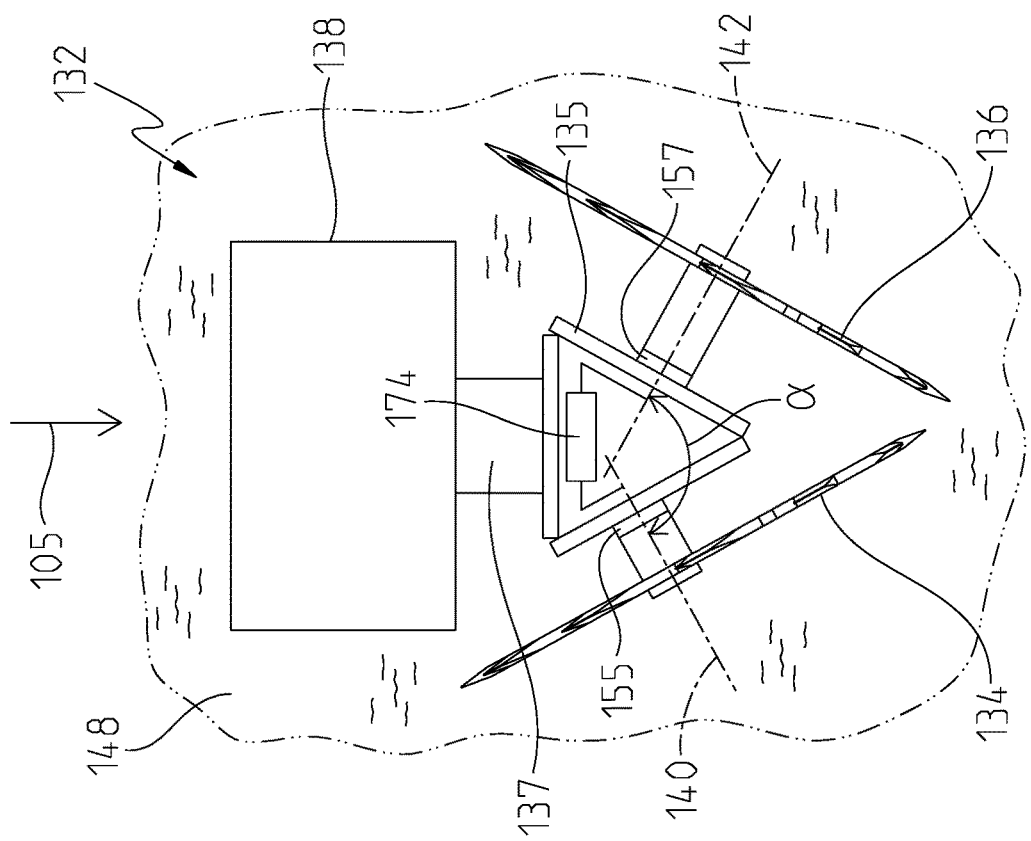

As shown in FIGS. 5A and 5B, when the clearing assembly 132 is viewed from a top view in a direction generally perpendicular to the surface of the soil 148, the first axis 140 forms a disk-to-disk angle $\alpha$ with the second axis 142. In FIG. 5A, the angle $\alpha$ is approximately 120 degrees; however, in other positions of the drive clearing-disk 134 or the driven clearing-disk 136 the angle $\alpha$ may have a different magnitude. As such, the driven clearing-disk 136 is movable relative to the attachment frame 135 (and movable relative to the drive clearing-disk 134) between (i) a first position in which a first disk-to-disk angle $\alpha$ is defined between the intersection of the first axis 140 and the second axis 142 and (ii) a second position in which a second disk-to-disk angle $\alpha$ is defined by the intersection of first axis 140 and the second axis 142. The second disk-to-disk angle $\alpha$ has a different magnitude than the first disk-to-disk angle $\alpha$. While the above description recites that that the driven clearing-disk 136 is movable, it should also be appreciated that the drive clearing-disk 134 may also be movable to vary the magnitude of the angle $\alpha$.

Figure 6A:
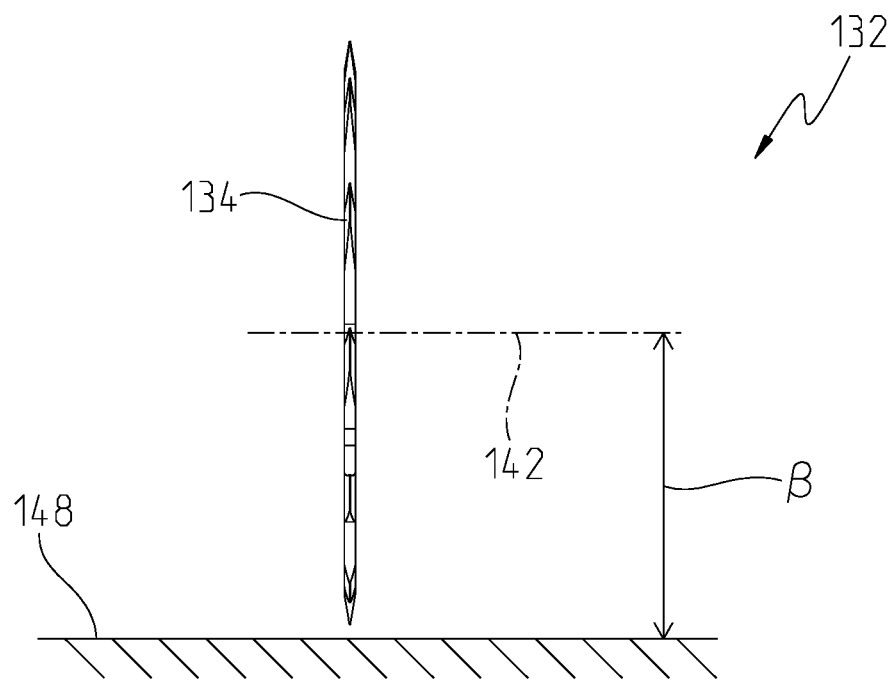
FIGS. 6A and 6B are side views of a clearing-disk included in the clearing assembly showing the clearing disk positioned at different disk-to-soil angles.
Figure 6B:
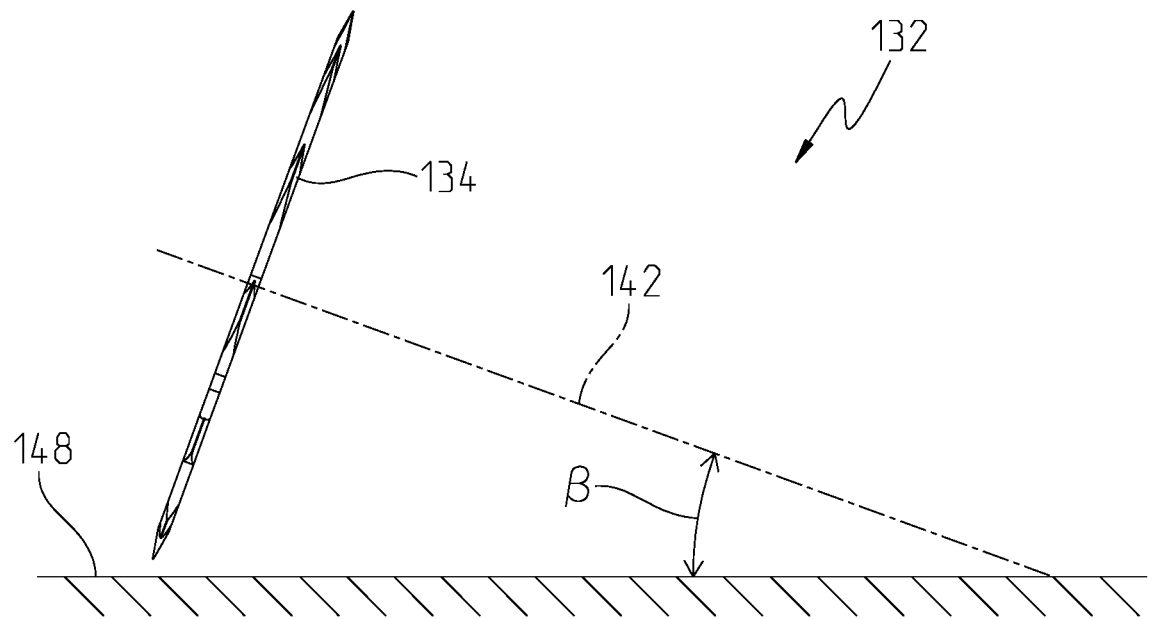

As show in FIGS. 6A and 6B, when the driven clearing-disk 136 of the clearing assembly 132 is viewed from a side view in a direction generally parallel to the surface of the soil 148, the second axis 142 forms a disk-to-soil angle $\beta$ with the surface of the soil 148. In FIG. 6A, the angle $\beta$ is zero degrees; however, in other positions (such as the position shown in FIG. 6B), the angle $\beta$ can be a non-zero angle. As such, the driven clearing-disk 136 is movable relative to the attachment frame 135 between (i) a third position in which a first disk-to-soil angle $\beta$ is defined between the second axis 142 and the surface of the soil 148 and (ii) a fourth position in which a second disk-to-soil angle $\beta$ is defined between the second axis 142 and the surface of the soil 148. The second disk-to-soil angle $\beta$ has a different magnitude than the first disk-to-disk angle $\beta$. While the above description recites that that the driven clearing-disk 136 is movable relative to the attachment frame 135, it should also be appreciated that the drive clearing-disk 134 may also be movable relative to the attachment frame 135 to vary the magnitude of the angle $\beta$.

Because the disk-to-disk angle $\alpha$ and the disk-to-soil angle $\beta$ can both be adjusted, in some positions the drive clearing-disk 134 and the driven clearing-disk 136 are not contained in a common plane. In other positions, the drive clearing-disk 134 and the driven clearing-disk 136 are contained in a common plane.

In some embodiments, the controller 174 is configured to adjust the disk-to-disk angle $\alpha$. In some embodiments, the controller 174 is configured to adjust the disk-to-soil angle $\beta$. In some embodiments, the controller 174 is configured to adjust one or both of the disk-to-disk angle $\alpha$ or the disk-to-soil angle $\beta$ in response any number of the following factors including: a speed of forward movement of the agricultural row unit 100 over the soil, a height of the drive clearing-disk 134 relative to the surface of the soil 148, a height of the driven clearing-disk 136 relative to a surface of the soil, an amount of crop residue in an agricultural row of the field, and a downforce on a portion the row unit 100.

It has been described herein that each of: the disk-to-disk height, the disk-to-soil height, the relative to forward-to-rearward positioning of the disks 143, 136, the disk-to-disk angle α, and the disk-to-soil angle β can be adjusted by one or more controllers. However, it should also be appreciated that in some embodiments, a user may manually adjust the heights, angles, or positions of the drive clearing-disk 134 and the driven clearing-disk 136.

It should be appreciated that in some embodiments, the agricultural row unit 100 includes: the attachment frame 135, the drive clearing-disk 134 coupled to the attachment frame 135 for rotation about the first axis 140, and a driven clearing-disk 136 coupled to the attachment frame 135 for rotation about the second axis 142; however, the motor is coupled to only one of the drive clearing-disk 134 and the driven-clearing disk 136.

In some embodiments, the agricultural row unit 100 includes only a single clearing disk 130, and the motor is coupled to the single clearing disk 130 to drive rotation of the clearing disk about a single-disk axis of rotation.

In some embodiments, the agricultural row unit 100 includes: the attachment frame 135; a plurality of clearing-disks 130 including at least a first clearing-disk (such as the clearing disk 134 coupled to the attachment frame 135 for rotation about the first axis 140). In some embodiments the motor may include a second clearing-disk (such as disk 136 coupled to the attachment frame 135 for rotation about the second axis 142). The agricultural row unit 100 may further include a plurality of motors including at least: a first motor coupled to the first clearing disk and configured to rotate the first clearing disk about the first axis. The plurality of motors may include a second motor coupled to the second clearing disk and configured to rotate the second clearing disk about the second axis. The plurality of motors may include additional motors and the plurality of clearing disks may include additional disks coupled to the additional motors. In the embodiments described above, the plurality of disks may be driven one or more motors of the plurality of motors.

Figure 7:
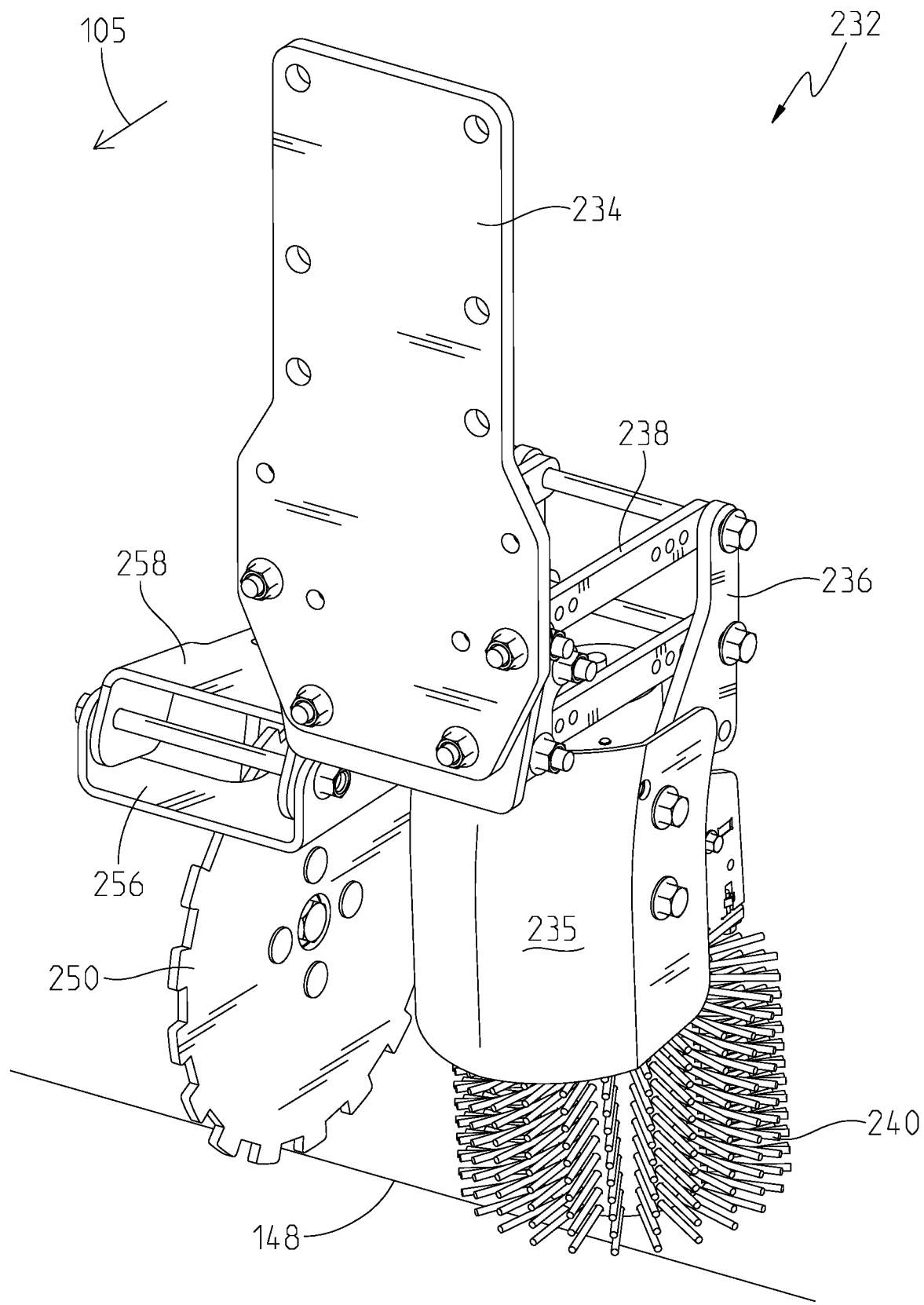
FIG. 7 is a front perspective view of another clearing assembly that is included in a planter row unit adapted for use with an agricultural machine.

Referring now to FIG. 7, another clearing assembly 232 is shown. The clearing assembly 232 includes an attachment plate 234, an attachment frame 236, a linkage assembly 238 coupled therebetween, and a clearing brush 240 coupled to the attachment frame 236. The attachment plate 234 is arranged on the agricultural implement in a rearward-facing orientation, such that the clearing brush 240 is arranged to be pulled by the attachment plate 234 in the forward direction 105 during forward movement of the row unit 100. The clearing assembly 232 is configured to rest on and move forwardly along the surface of the soil 148 during operation of the row unit 100. In some embodiments, the clearing assembly 232 further includes a cover 235 arranged to protect a drive unit or other components from debris or residue that may be encountered during forward movement of the row unit 100.

Figure 8:
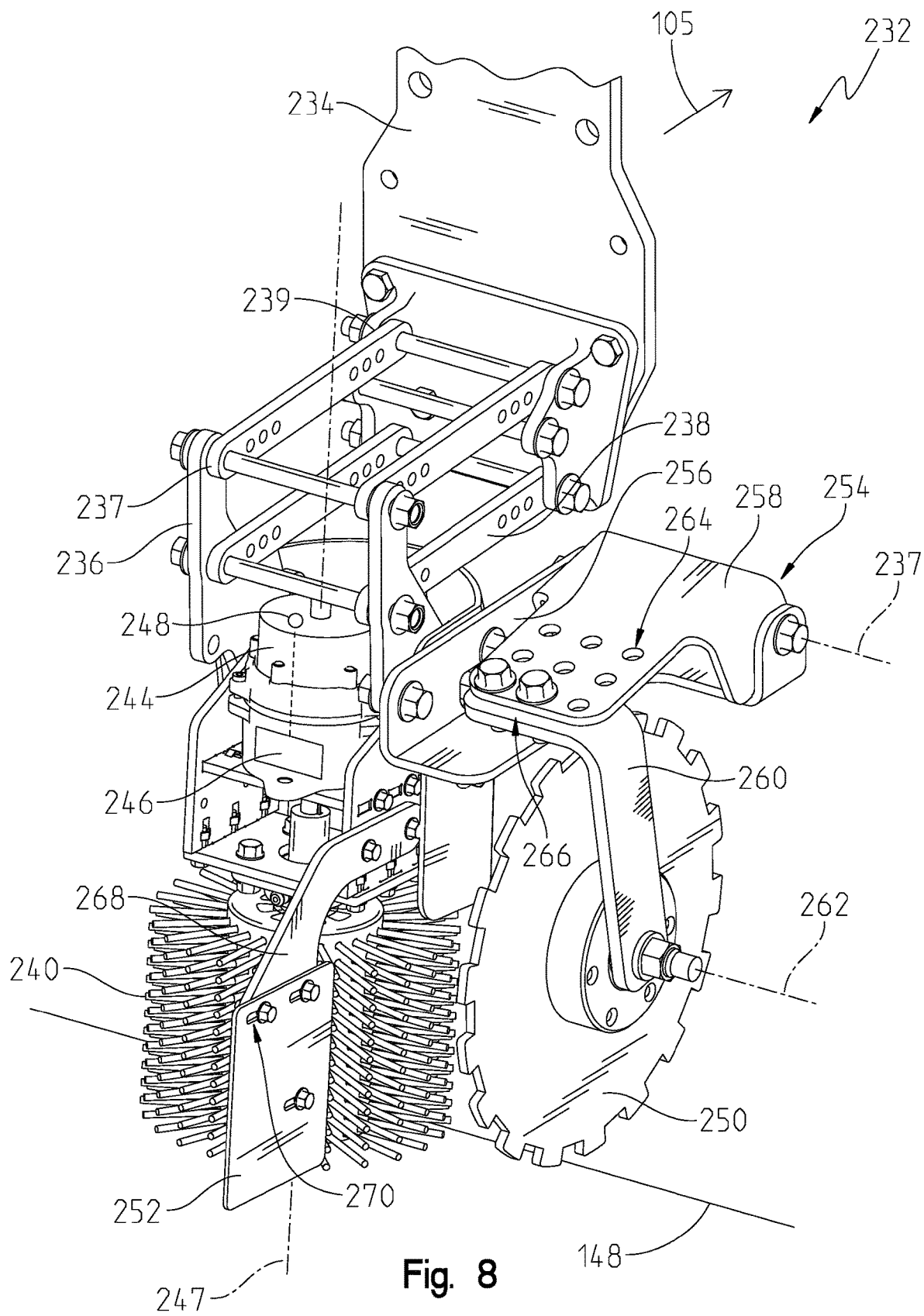
FIG. 8 is a rear perspective view of the clearing assembly of FIG. 7.

In some embodiments, the clearing assembly 232 also includes a final drive assembly configured to drive rotation of the clearing brush 240. As shown in FIG. 8, the final drive assembly can be driven by a drive unit 244 or other power mechanism. In the illustrative embodiment, the drive unit 244 is an electric motor included in the clearing assembly 232. It should be appreciated the row unit 100 may include a plurality of clearing assemblies 232, and each clearing assembly 232 may include a separate drive unit 244. Further, the row unit 100 may move along several of agricultural rows of field simultaneously. As such, each individual agricultural row may be cleared by corresponding clearing assembly 232 having a corresponding drive unit 244.

In some embodiments, each clearing assembly 232 may include a controller 246 electrically coupled to the drive unit 244. The controller 246 is configured to adjust the drive speed of the drive unit 244 in response to one or more factors including: a speed of forward movement of the agricultural row unit 100 over the soil, an amount of crop residue in an agricultural row of the field, and a downforce on a portion the row unit 100. The sensor 248 is configured to identify the amount of crop residue or other material in an agricultural row of the field and transmit a signal to the controller 246 indicative of the amount of crop residue or other material. The controller 246 may also be configured to adjust the drive speed in response to a predetermined prescribed operating plan for the field. In some embodiments, each clearing assembly 232 may further include a sensor 248 electrically coupled to the controller 246. In other, embodiments, a user may adjust the drive speed of the drive unit 244 via a user input separate from the controller 246.

Referring still to FIG. 8, the linkage assembly 232 includes first and second pivotable ends 237, 239. As such, the linkage assembly 238 may include fours bars that are each pivotably coupled at their first ends 237 to the attachment frame 236 and at their second ends 239 to the attachment plate 234. Because the linkage assembly 238 is pivotable at both ends 237, 239, the linkage assembly 238 facilitates vertical travel of the clearing brush 240 relative to the row unit shank 128. Thus, as a nose (not shown) of the clearing brush 240 rests on and is moved over uneven soil, the linkage assembly 238 facilitates vertical movement of the clearing brush 240 relative to the row unit shank 128. It should be appreciated, that while a four-bar linkage assembly is shown in FIG. 8, other linkage assemblies may be used with the row unit 100, so long as those linkage assemblies facilitates vertical travel of the clearing brush 240.

Figure 9:
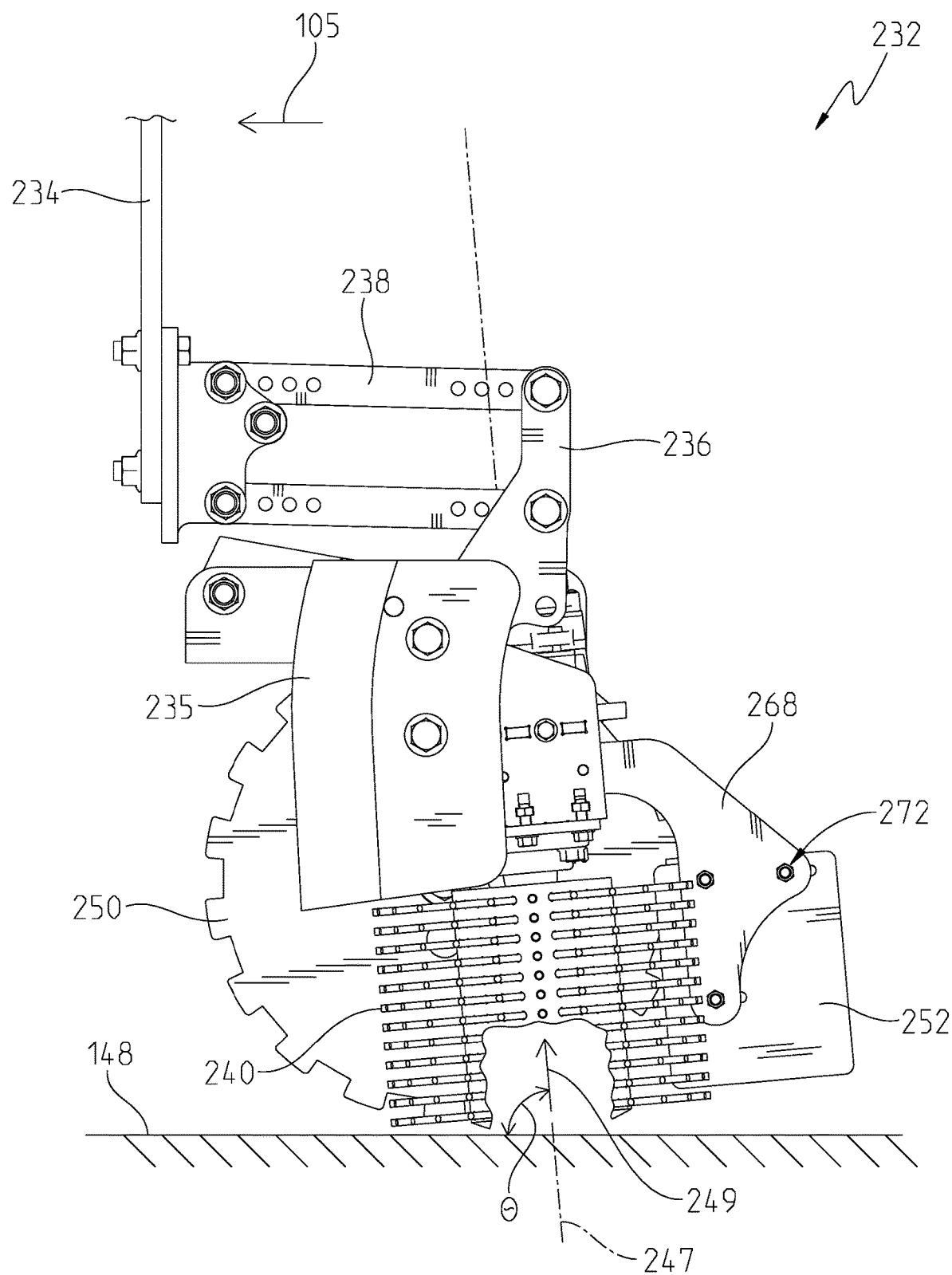
FIG. 9 is a side view of the clearing assembly of FIGS. 7 and 8 with a portion cut away to show a vector with its vertical component being greater than its horizontal component.

As shown in FIGS. 8 and 9, the clearing brush 240 is configured to rotate about its longitudinal axis 247. The longitudinal axis 247 of the clearing brush 240 defines a vector 249 having a horizontal component and a vertical component that is greater than the horizontal component. As used herein vertical component and horizontal component are meant to refer to the vertical component of extension and the horizontal portion of extension. For example, a brush with a longitudinal axis having a vertical component equal to its horizontal component would be a brush with a longitudinal axis disposed at a 45 degree angle relative to the surface of the soil 148. Thus, the clearing brush 240 shown in FIG. 9, is disposed at an angle θ relative to the surface of the soil 148, and the angle θ is greater than 45 degrees.

As shown in FIG. 9, the clearing assembly 232 includes a lateral shield 250 and a knock-off shield 252. The lateral shield 250 is pivotably coupled to the attachment frame 236 for movement relative to the attachment frame 236 in the vertical direction. In the illustrative embodiment, the clearing assembly 232 includes a lateral-connecting unit 254 including a bracket 256, a first arm 258, and a second arm 260. The bracket 256 is coupled to the attachment frame 236 via a plurality fasteners, and when the bracket 256 is coupled to the attachment frame 236, the bracket 256 is fixed relative to the attachment frame 236. The first arm 258 is pivotably coupled to the bracket 256 for rotation about an axis 237 transverse to the clearing assembly 232. Pivoting movement of the first arm 258 relative to the bracket 256 moves the lateral shield 250 vertically relative to the attachment frame 236.

The second arm 260 is removably coupled to the first arm 258 of the lateral shield 250. In the illustrative embodiment, the first arm 258 includes a plurality of apertures 264 (for example three rows of three), and the second arm 260 includes a plurality of apertures 266 (for example one row of two). A plurality of fasteners may be inserted into each of the pluralities of apertures 264, 266 to removably couple the first arm 258 to the second arm 260. The second arm 260 is further coupled to the lateral shield 250 at a rotational axis 262 of the lateral shield 250.

It should be appreciated that the lateral shield 250 is moveable between (a) a plurality of lateral positions in each of which the lateral shield 250 is spaced apart a different lateral distance from the longitudinal axis 247 of the clearing brush 240, and between (b) a plurality of axial positions in each of which the lateral shield 250 is spaced apart a different forward-rearward distance from the longitudinal axis 247 of the clearing brush 240. By removing the fasteners from a first pair of apertures of the first arm 258 and inserting the fasteners into a second pair of apertures of the first arm 258, the lateral or axial positions of the lateral shield 250 may be changed. As clearing brush 240 rotates about its longitudinal axis 247, it thrusts residue laterally away from the longitudinal axis 247 toward the lateral shield 250. The lateral shield 250 is aligned vertically with at least a portion of the clearing brush 240. As such, the residue thrusted toward the lateral shield 250 is prevented from moving laterally beyond the lateral shield 250.

The knock-off shield 252 is coupled to the attachment frame 236 and configured to contact the clearing brush 240 to remove residue from the clearing brush 240 when the clearing brush 240 is rotated about its longitudinal axis 247. In the illustrative embodiment, a connecting arm 268 is coupled between the attachment frame 236 and the knock-off shield 252. The knock-off shield 252 includes a plurality of slots 270 and the connecting arm includes a plurality of apertures 272 (see FIG. 9). The slots 270 and apertures 272 are configured to receive a plurality of fasteners to couple the knock-off shield 252 to the connecting arm 268. When the knock-off shield 252 is coupled to the connecting arm 268, the slots 270 may be described as axially-extending slots 270. As such, when the fasteners are inserted in the apertures 272 and in the axially-extending slots 270 but not yet tightened, the knock-off shield 252 can slide axially relative to the connecting arm 268 to adjust the axial position of the knock-off shield 252 relative to the clearing brush 240. In this way, the knock-off shield 252 may be arranged a predefined distance away from the longitudinal axis 247 of the clearing brush 240. The distance may be reduced to allow a greater portion of the clearing brush 240 to contact the knock-off shield 252 during rotation of the clearing brush 240. The distance may be increased such that a lesser portion of the clearing brush 240 contacts the knock-off shield 252 during rotation of the clearing brush 240.

Based on the above disclosure, it should be understood that a cleared portion of residue is formed between the lateral shield 240 and the knock-off shield 252 as the row unit 100 moves in the forward direction with the clearing brush 240 rotating about its longitudinal axis 247. The width of the cleared portion of residue can be adjusted by adjusting the lateral position of the lateral shield 250.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A row unit configured to clear residue during a planting operation, comprising:
   an axially extending linkage assembly including a first end and a second end movable in a vertical direction relative to the first end during the planting operation;
   an attachment frame pivotably coupled to the second end of the linkage assembly;
   a clearing brush coupled to the attachment frame and configured to rotate about a vertically extending axis to move residue laterally away from the vertically extending axis during the planting operation;
   a motor coupled to the clearing brush and configured to drive rotation of the clearing brush about the vertically extending axis; and
   a lateral shield positioned adjacent to the clearing brush and configured to receive residue moved laterally by the clearing brush during the planting operation;
   wherein the lateral shield is configured to pivot about a first laterally extending axis to facilitate vertical movement of the lateral shield relative to the attachment frame during the planting operation; and
   wherein the lateral shield is configured to contact ground and rotate about a second laterally extending axis during the planting operation.

2. The row unit of claim 1, wherein the clearing brush is cylindrical.

3. The row unit of claim 1, wherein the lateral shield is vertically and axially aligned with at least a portion of the clearing brush and laterally spaced apart from the clearing brush during the planting operation.

4. The row unit of claim 1, wherein the lateral shield is adjustable laterally to a plurality of positions such that in each position of the plurality of positions the lateral shield is spaced apart a different distance laterally from the clearing brush.

5. The row unit of claim 1, wherein the lateral shield is adjustable axially to a plurality of positions relative to the clearing brush.

6. The row unit of claim 1, wherein the lateral shield is coupled to the attachment frame via a brace assembly including a first arm configured to pivot about the first laterally extending axis.

7. The row unit of claim 6, wherein the brace assembly includes a second arm extending downward from the first arm; and
   wherein the second arm includes a first end coupled to the first arm and a second end coupled to the lateral shield.

8. The row unit of claim 7, wherein the first end of the second arm is coupleable to the first arm at, at least one of:
   a plurality of axially adjacent locations on the first arm to facilitate axial adjustment of the lateral shield relative to the clearing brush; and
   a plurality of laterally adjacent locations on the first arm to facilitate lateral adjustment of the lateral shield relative to the clearing brush.

9. The row unit of claim 1, wherein the clearing brushing is coupled to the attachment frame such that the vertically extending axis about which the clearing brush is configured to rotate forms a non-right angle with a level surface of the ground.

10. The row unit of claim 1, further comprising a knock-off shield coupled to the attachment frame and positioned laterally between the vertically extending axis about which the clearing brush is configured to rotate and the lateral shield.

11. The row unit of claim 10, wherein the clearing brush is configured to contact the knock-off shield during rotation of the clearing brush about the vertically extending axis.

12. The row unit of claim 10, wherein at least a portion of the knock-off shield is positioned axially rearward of the vertically extending axis about which the clearing brush is configured to rotate.

13. The row unit of claim 10, wherein a position of the knock-off shield is adjustable axially relative to the vertically extending axis about which the clearing brush is configured to rotate.

14. A row unit for an agricultural machine configured to clear residue during a planting operation, comprising:
   an attachment frame;
   a lateral shield positioned adjacent to the attachment frame; and
   a rotatable residue clearer coupled to the attachment frame and configured to move residue laterally toward the lateral shield during the planting operation;
   wherein the lateral shield is configured to pivot about a first laterally extending axis to facilitate movement of the lateral shield relative to the attachment frame during the planting operation; and
   wherein the lateral shield is configured to contact ground to cause rotation of the lateral shield about a second laterally extending axis during the planting operation.

15. The row unit of claim 14, wherein the rotatable residue clearer rotates about a vertically extending axis.

16. The row unit of claim 14, wherein the rotatable residue clearer is a brush.

17. A method of operating a row unit of an agricultural machine to clear residue, comprising:
   rotating a clearing brush of the row unit about a vertically extending axis to move residue laterally away from the vertically extending axis during a planting operation;
   receiving the residue moved by the clearing bush with a lateral shield of the row unit, which is spaced apart from the clearing brush; and
   forming a row of residue that is spaced apart from the vertically extending axis and positioned laterally between the clearing brush and the lateral shield.

18. The method of claim 17, further comprising:
   contacting the ground with the lateral shield during the planting operation to cause pivoting movement of an arm, to which the lateral shield is coupled, relative to an attachment frame, to which the arm and the clearing brush are coupled, to move the lateral shield vertically.

19. The method of claim 17, further comprising:
   contacting the ground with the lateral shield during the planting operation to cause rotation of the lateral shield.

* * * * *